INVENTOR
ACHILLE GALLIZIA

United States Patent Office 3,621,518
Patented Nov. 23, 1971

3,621,518
APPARATUS FOR PRODUCING BATCHES OF ELASTOMERIC COMPOSITIONS AT THE HIGHEST TEMPERATURE CONSISTENT WITH THE NATURE OF THE COMPOSITIONS
Achille Gallizia, Milan, Italy, assignor to Pirelli S.p.A., Milan, Italy
Original application Sept. 24, 1968, Ser. No. 762,014. Divided and this application Mar. 25, 1970, Ser. No. 25,613
Claims priority, application Italy, Sept. 29, 1967, 21,051/67
Int. Cl. B29c 3/06
U.S. Cl. 18—2 J                                    6 Claims

ABSTRACT OF THE DISCLOSURE

Charges of elastomeric material of predetermined uniform weight(s) for introduction into molds are produced by heating and forming elastomeric material into an intermediate article of substantially uniform cross section, sensing the length of the article, and cutting the article into individual charges of predetermined length employing photocell actuated apparatus to sense and cut the lengths of the preform.

---

Figure 1:
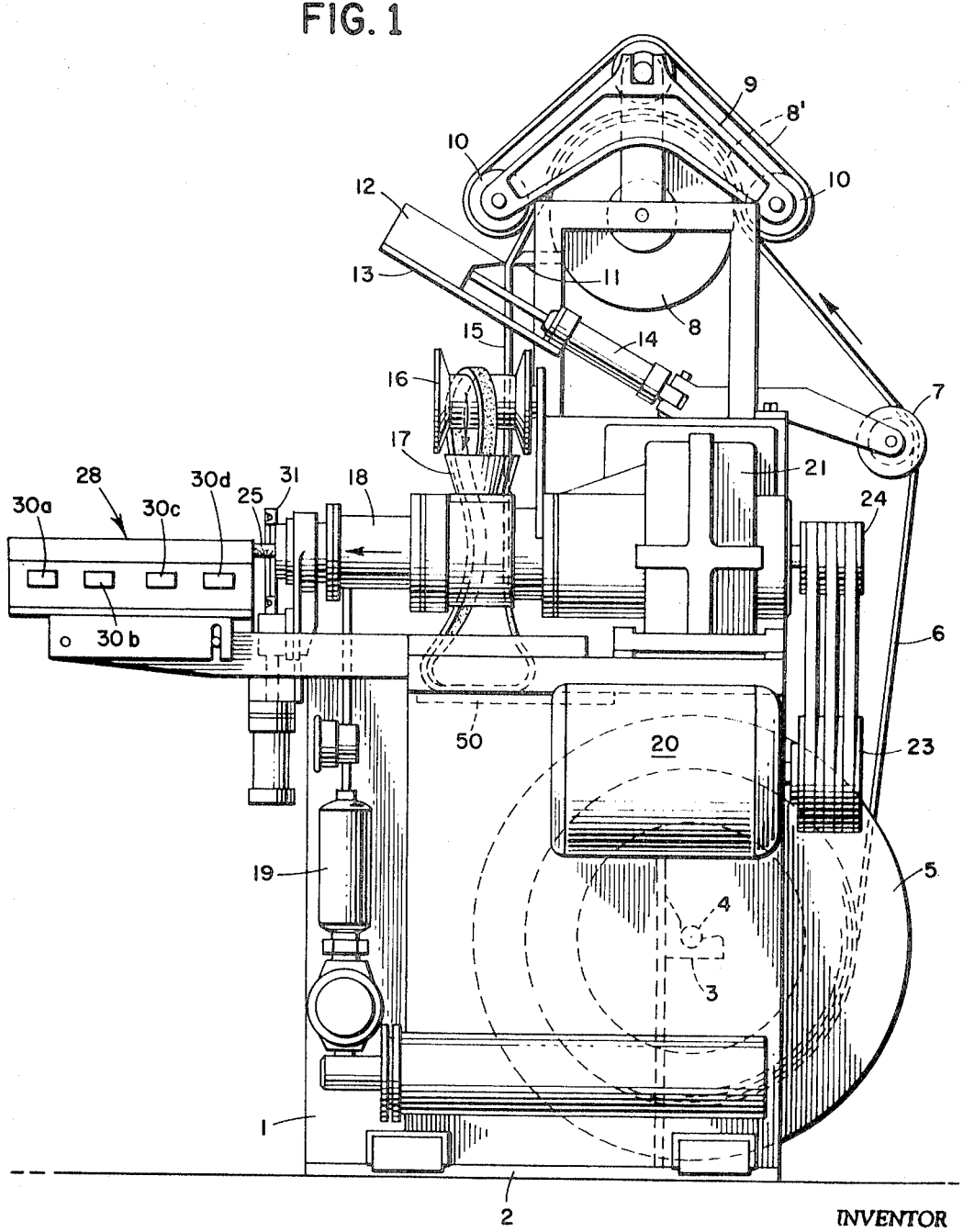

This application is a division of my co-pending application, Ser. No. 762,014, filed Sept. 24, 1968.

The present invention relates to process and apparatus for producing substantially uniform charges or batches of elaestomeric compositions, which each constitute a semi-finished product or preform which is to be further treated in a mold. The charges are prepared at the highest temperature consistent with the nature of the elastomeric composition.

Conventional prior art processes for preparing mold charges, in general, comprise a sequence of separate operations which require the attention of a number of operators. Such processes, in addition to having high labor costs, are relatively time consuming since they are not fully mechanized.

According to prior art processes, the starting material is usually a large band of elastomeric material such as that obtained from a calender. The band is cut into pieces of the desired size. For this purpose, the contour of the pieces to be produced is first marked on the band of material, and then the band is cut along the previously marked lines by means of a shearing machine. Alternatively, the starting material can be an extrusion produced by an extruder, which extrusion is cut into pieces by the procedure described above.

After the starting material is cut into pieces, the pieces are weighed to check their weight since the prior art procedures do not produce cut pieces of uniform weight. During the procedure for checking the weight of the cut pieces, the operator manually adds to or removes from each piece sufficient material to obtain a weight corresponding as closely as possible to the predetermined desired weight of an individual piece. Therefore, the term "batch" or "charge" is properly applied to the preforms of the prior art only after the weight control step. In spite of the skill and experience of operators who carry out the weight control step, the drawbacks relating to lack of precision in the preparation of the batches are not fully eliminated.

The principal disadvantage of the prior art methods is that it is not possible to obtain individual batches or charges each having essentially the exact predetermined weight so as to minimize the formation of flashes on the finished molded article. Also, according to the prior art methods it is not possible to eliminate waste due to the use of molding charges of insufficient size which leads to the production of an incomplete finished article.

In view of the last mentioned prior art disadvantage, it has been general practice to prevent the formation of incomplete articles due to use of insufficient charge material by intentionally preparing charges of somewhat greater weight than necessary. However, this is disadvantageous since it results in increased formation of flashes and increased consumption of the material.

With further reference to the prior art procedures, the individual charges, when ready, are stacked in an orderly fashion near the presses in superimposed layers with appropriate protective sheets interposed to prevent sticking between adjacent charges. The average time necessary to prepare a finished charge according to this conventional process is about 10 minutes. Furthermore, the stacked charges are cold when ready for use and this leads to consequent processing troubles resulting in a longer molding time and the adoption of higher operating pressures.

It is a principal object of the present invention to produce substantially uniform mold charges more economically and at a higher rate of production than prior art processes.

Another object of the present invention is to provide mold charges which are produced and are ready for use at the highest temperature consistent with the nature of the elastomeric composition.

A further object of the invention is to produce mold charges which may be processed into finished articles faster and at lower operating pressures than prior art processes.

Still another object of the invention is the direct production of mold charges having substantially uniform weights falling within a very narrow range of weight tolerances in order to eliminate the weight control operations of prior art processes.

Other objects and advantages of the invention will become more apparent as this description proceeds.

In keeping with the above objects, the present invention permits obtaining a charge ready for molding in an average time which is substantially shorter than usual prior art processing times for preparing a charge of similar size. For example, a charge which according to the prior art methods may be produced in the above mentioned prior art average time of about ten minutes, may be obtained according to the invention in an average time of about four minutes.

The process of the invention is characterized by an operating cycle comprising the following stepes:

(a) Heating and converting a continuous band or strip of elastomeric starting material into an article of practically constant transverse cross section,
(b) Sensing the length of the articles being formed and comparing it to a pre-established standard,
(c) Stopping the formation of this article when its predetermined length has been reached,
(d) Cutting the formed article either simultaneously or immediately after its production to produce a mold charge said cutting being along a plane coinciding with the line from which the length determination was started, that is, a line adjacent the emergence of the article from its source,
(e) Removing the formed charge, and
(f) Restarting the cycle to form further articles of desired length according to a pre-established program.

Apparatus suitable for carrying out the invention comprises in its broad aspects means for heating and forming elastomeric starting material into a shaped article having a substantially constant transverse cross section, means for sensing the length of the article being produced and comparing it to a predetermined value, means for cutting the article along a plane coinciding with the line from which the length determination was started, said latter line being foreseen at the emergence of the article from its source, and means for controlling the intermittent operation of the various elements in the apparatus in accordance with a pre-established program.

Assuming that the starting material to be processed is a band of elastomeric material of considerable width such as that obtained from a calender or preferably from a "batch off," the cross section of the band is first reduced to convert it into a continuous strip. Of course, if the band already has a suitable small cross section, the above mentioned reduction operation is not required. In any event, the objective is to provide a continuous strip of material having a reduced transverse cross section which is suitable for being fed to a forming apparatus which gives at its outlet a shaped article having a practically constant transverse cross section. In this way, the use of operators to load said apparatus is eliminated.

According to the process of the present invention, intermediate articles of predetermined length, either equal to or different from each other, are repeatedly produced in accordance with a pre-established program.

The main sequential steps of the process are as follows:

The starting material constituted by a band of elastomeric composition, is converted into a shaped article of practically constant cross section. During this operation, the elastomeric material is heated and its temperature is controlled and maintained below a pre-established value depending upon the nature of the material. As soon as the article being formed has reached the desired length, the forming operation is stopped, and simultaneously or immediately thereafterwards, the formed article is cut to the desired length to obtain a charge or batch of the desired size and weight. By operating in this way, the charge may be produced at the highest possible temperature and is ready to be introduced into the mold of the press in a heated condition.

The shaped article may have any convenient configuration, for example, it may be a rod, a slab, or a tube etc. Regardless of the cross section of the article, it is important that the cross section, whatever its form, be practically constant throughout. The constant transverse cross section of the article serves to establish a linear relationship between the length of the article and its weight. The weight of the article is in fact measured by means of a device which reads the length of the article exiting from an extruder or similar forming device.

All of the above indicated steps are carried out without manual intervention by means of signals received from or issued by a control circuit which establishes the sequence of operations. In this way, it is no longer necessary to check the weight of the individual formed charges because their formation is carried out automatically in a precise manner. Moreover, the charges can be introduced into the press at a high temperature since the charges may be produced only as required by the press.

The principles of operation described above are applicable both when all charges must have the same weight, and when charges of different weights, selected within a limited range of values are to be prepared. When the charges to be produced each have the same weight, the process is carried out by repeating indefinitely the main sequence of operation described above. When it is desired to produce charges having different weights, the process is carried out by repeating indefinitely a suitable predetermined sequence of operations. For example, it may be desired to produce three groups of charges of three different weights which are to be fed to three groups of presses producing different articles or producing the same article in different sizes and weights. The weights of the three groups of charges to be formed may be designated by the values X, Y and Z, different from each other. It will be appreciated that since the charges have different weights, their molding times will be different. Therefore, in a given period of time the three groups of presses will process different numbers of charges. Consequently, the different charges must be supplied according to a certain sequence and a certain rhythm in order to meet the demand. The sequence and the rhythm of the required charges or batches are established when planning the production run, and this data is introduced into the charge-forming apparatus according to a stated program employing suitable circuits.

As an illustration, it will be assumed that the sequence of producing charges of different weights is to first produce a charge of weight X, then a charge of weight Z, followed by another charge of weight X, and then a charge of weight Y, after which the sequence is repeated. Starting from the beginning of this sequence, a shaped intermediate article is formed until its length reaches a value of $L_X$. When this length is reached, the forming operation is stopped, and the length is cut off to obtain a charge of weight X. This charge is removed and supplied to the appropriate press. Thereafter, the forming operation is recommenced and continued until the formed article reaches a length $L_z$. Then the forming operation is stopped, and the newly formed shaped article is cut to obtain a charge having weight Z which is then supplied to the appropriate press. In like manner, another charge of weight X is obtained followed by production of a charge of batch Y. Thereafter, the cycle is repeated.

Figure 2:
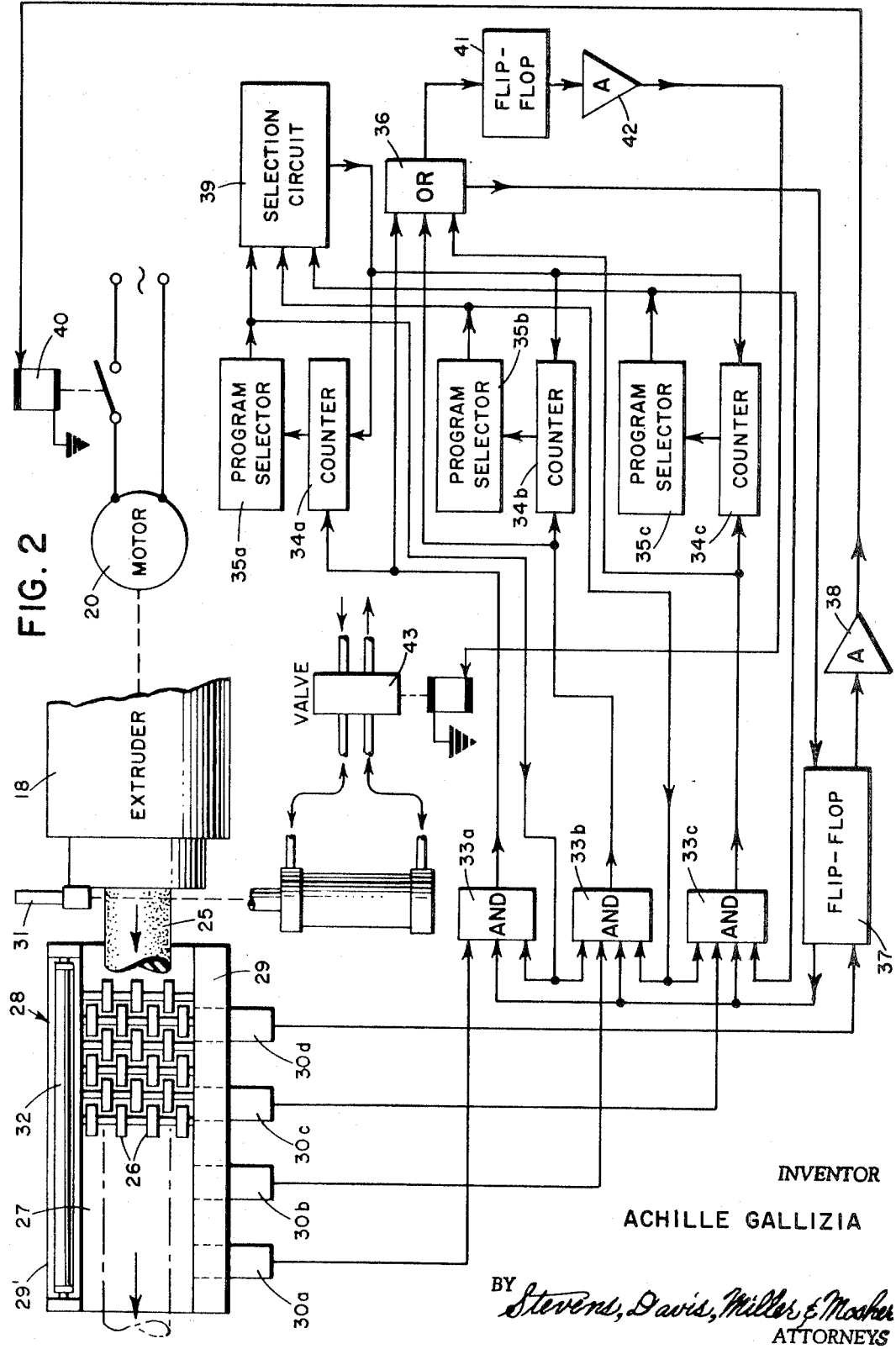

The present invention will be better understood from the following detailed description which is given by way of non-limiting example and by reference to the attached drawings in which:

FIG. 1 is a side view of an exemplary embodiment of apparatus suitable for carrying out the invention, and FIG. 2 is in part a plan view of a portion of the apparatus of FIG. 1, and in part a diagrammatic view of electrical control means employed in carrying out the invention.

Referring to FIG. 1, the apparatus comprises a main frame 1 extending upwardly from a base 2, which frame supports the various elements constituting the apparatus. Two brackets 3 mounted on frame 1 are provided with a recess to receive and retain the ends of a horizontal shaft 4 of a bobbin 5.

The elastomeric starting material is in the form of a band 6 which has a large transverse size and is wound on the bobbin 5. The band may be produced by a calender or preferably by a "batch-off." One end of the band 6 passes upwardly over a roller 7 into the nip between a driving roller 8 and a cooperating pressure belt 8'. Belt 8' is trained around driving and guide rollers 10 which are mounted in a frame 9 which is disposed on top of the driving roller 8. The band 6 then passes through a gap between a fixed blade 11 and a moving blade 12 of a zig-zag cutter 13. The zig-zag cutter is operated by a pneumatic device comprising a pair of piston cylinders 14 and cooperating pistons, only one of the piston cylinders being shown in FIG. 1. The zig-zag cutter is preferably that described in Italian Patent No. 791,142.

The zig-zag cutter reduces the size of the band 6 and converts it in to a continuous strip 15. As seen in FIG. 1, the intermediate portion of the continuous strip 15 rests on a plate 50 of a scale (not shown) which controls by its movement the starting and stopping of cutter 13. Strip 15 is conveyed around a guide roller 16 into the hopper 17 of a conical extruder 18. The conical extruder may be for instance an extruder as described in U.S.A. Patent No. 3,191,229.

In the extruder 18, the material is heated to a temperature which is determined according to the nature of the elastomeric composition. Conventional temperature sensing and heat exchange means indicated by reference numeral 19 are employed to regulate the temperature. The screw of extruder 18 is operated by a motor 20 which is connected to a speed reducer 21 by means of a plurality of belts 22 which are mounted on pulleys 23 and 24.

The elastomeric material is extruded from the conical extruder 18 in the form of a shaped extrusion 25. The extrusion 25 is passed over a plurality of small rollers 26 onto the flat central portions 27 of the U-shaped support element 28 which has a pair of sides 29, 29' (FIG. 2).

A wire cutter 31 is mounted at the extruder orifice and the cutting element of the cutter moves in a plane perpendicular to the extruder axis. The extrusion is cut along a plane which constitutes the starting point for measuring the length of the formed articles or extrusions. As is apparent, the starting point is situated in close proximity in the extruder orifice which constitutes the means which determines the cross section of the extrusion.

During the course of cutting the extrusion, the cutting element of the wire cutter 31 is moved from its rest position, into contact with the extrusion, and then to a waiting position, that is, it is moved from one side of the extruder orifice to the other. The cutting element remains in the waiting position until, after removal of the cut extrusion, the formation of a new extrusion is started. In the moment immediately preceding actuation of the extruder, the cutting element returns to its rest position to be ready for the next operating cycle.

Referring now to FIG. 2, a series of photoelectric cells 30a, 30b and 30c, and a block photoelectric cell 30d are provided at the side 29 of the U-shaped support element 28. A light source 32 is provided at the side 29' of the elements 28 for the purpose of directing illumination onto the photoelectric cells. A plurality of circuits are connected to each photoelectric cell. A gate circuit AND 33a, a circuit decade counter 34a and a program selector 35a are connected to photoelectric cell 30a. A gate circuit AND 33b, a circuit decade counter 34b and a program selector 35b are connected to photoelectric cell 30b. A gate circuit AND 33c, a circuit decade counter 34c, and a program selector 35c are connected to photoelectric cell 30c.

The assembly of the circuits connected to photoelectric cells 30a, 30b, 30c is connected both to a selection circuit 39 for repeating the cycle and to a gate circuit OR 36 which, through a suitable flip-flop circuit 37, is connected to an amplifier 38 for the actuation of the relay 40 controlling the extruder, and through the flip-flop circuit 41 is connected to an amplifier 42 for the actuation of an electrically operated valve 43 connected to the wire cutter. The block photoelectric cell 30d is in turn connected to the gate circuits AND 33a, 33b, 33c and to the flip-flop circuit 37.

After having established in the production planning, the main sequence for the operation of the apparatus, the working data are supplied to the program selectors, and the photoelectric cells 30a, 30b, 30c are positioned on the side 29 of the U-shaped element 28 at pre-established distances from the orifice of extruder 18, according to the required lengths of the extrusions.

The operation of the apparatus will now be described for the production of a charge employing photoelectric cell 30a as the "on" cell. With the extruder operating, the extrusion leaving the extruder orifice progressively increases in length. When the free end of the extrusion reaches photoelectric cell 30d and passes between it and the source of light 32, this results in photoelectric cell 30d going "out" whereby it transmits a signal to gate circuits AND 33a, 33b, and 33c preparing them for signals coming from the corresponding photoelectric cells. When the free end of the extrusion reaches photoelectric cell 30c, this cell goes "out" and transmits a signal to its gate circuit 33c. This signal cannot pass through the circuit because the program selector 35c has not prepared the gate circuit AND 33c for the passage of the signal. In like manner, no signal passes through gate circuit AND 33b when the free end of the extrusion reaches the photoelectric cell 30b.

However, when the free end of the extrusion reaches the photoelectric cell 30a, this cell goes "out" and transmits a signal to the gate circuit AND 33a. This circuit has been prepared for the passage of the signal by program selector 35a. Accordingly, said signal passes through the gate circuit AND 33a, and is sent through gate circuit OR 36 to the flip-flop circuit 37, and from there to amplifier 38 for the actuation of the relay 40 controlling the extruder 18 to stop the extruder.

The same signal outcoming from the gate circuit OR 36 is sent through the flip-flop circuit 41 and the amplifier 42 to the relay controlling the electrically operated valve 43 for the actuation of the wire cutter 31. Simultaneously or after the extruder is stopped, the wire cutter is actuated and the formed length of the extrusion is cut in proximity to the extruder orifice. To restart the extruder, it is necessary to illuminate the photoelectric cells 30a and 30d, and this takes place when the cut extrusion is removed from U-shaped element 28 to be introduced into the mold of a press. When illumination again reaches the photoelectric cell 30d and it is "on," it issues a signal towards the gate circuits 33a, 33b and 33c. Signals are also issued from the photoelectric cells 30a, 30b, 30c. The signals issued by the photoelectric cells 30b and 30c are unable to pass through their corresponding gate circuits AND 33b and 33c, as the corresponding program selectors 35b and 35c have not prepared said passage. On the contrary, the signal issued from the photoelectric cell 30a passes through its gate circuit AND 33a and, following the path described above, reaches the relay 40 to restart the extruder. At this moment the circuit decade counter 34a records the fact that a charge has been produced by means of the photoelectric cell 30a, and the same or another photoelectric cell, according to the stated program is "on" for the production of the next charge.

When a main sequence has been completed, the selection circuit 39 prepares the various circuits connected with the photoelectric cells for the next cycle.

In the described embodiment, where only three photoelectric cells are used, the main sequence can provide charges or batches in any order, provided that they are arranged according to an increasing or decreasing weight. However, by using a greater number of photoelectric cells, it is possible to provide a main sequence in which the order for the formation of the charges is not subject to limitations.

A preferred embodiment of the invention has been described above; it will be understood that the invention includes any other embodiment deriving from the above indicated inventive principles.

I claim:

1. Apparatus for producing substantially uniform charges of elastomeric material for introduction into a mold from a band of elastomeric material as produced in a batch-off comprising means for reducing the transversal size of a band of elastomeric material into a single, continuous strip of reduced transversal size, extrusion means operating intermittently for heating and converting the elastomeric material forming the strip into a shaped article having a practically constant transverse cross-section, sensing means for determining when the length of said shaped article reaches a pre-determined value, cutting means for cutting said article along a plane coinciding with the line from which the length of determination was started, and means for controlling intermittent operation of the apparatus in accordance with pre-established program.

2. Apparatus according to claim 1 wherein said extrusion means is a conical extruder.

3. Apparatus according to claim 1 wherein said means for reducing the transversal size of said band is a zig-zag cutter.

4. Apparatus according to claim 1, wherein said sensing means comprise a U-shaped support element having a core portion to support the article being formed, roller means for supplying the article being formed to said core portion, a plurality of photoelectric cells provided in one side of said U-shaped support element, a light source for said photoelectric cells provided in the other side of said U-shaped support element, said photoelectric cells being aligned along the direction of movement of the article, and control means operatively connected to said photoelectric cells according to a pre-established program so that when the free end of the article reaches a preselected operating photoelectric cell, the latter issues a signal to stop the formation of said article.

5. Apparatus according to claim 1, in which said means for controlling intermittent operation of the apparatus comprise a plurality of photoelectric cells, each of said photoelectric cells being provided within a circuit regulated by a pre-established program, a block photoelectric cell operatively connected to said plurality of photoelectric cells, a light source for illuminating each of the above mentioned photoelectric cells, electro mechanical means connected to said extruder and operatively connected to said photoelectric cells to stop said extruder and to actuate said cutting means to cut the formed article each time an energized one of said plurality of photoelectric cells and said block photoelectric cell are "out" and to restart the extruder when said photoelectric cells are "on."

6. Apparatus according to claim 1, wherein said cutting means is a wire cutter.

References Cited

UNITED STATES PATENTS

| | | | |
|---|---|---|---|
| 2,026,754 | 1/1936 | Stafford. | |
| 2,371,709 | 3/1945 | Rineer | 18—12 TS |
| 3,039,138 | 6/1962 | Hall et al. | 18—12 TS X |
| 3,128,500 | 4/1964 | Cunningham | 18—12 TS |
| 3,155,750 | 11/1964 | Dahn et al. | 264—40 |
| 3,381,072 | 4/1968 | Mutton et al. | 264—148 |

H. A. KILBY, Jr., Primary Examiner

U.S. Cl. X.R.

18—2 HA, 12 TS; 264—148